United States Patent [19]

Sgariboldi

[11] Patent Number: 5,439,182
[45] Date of Patent: Aug. 8, 1995

[54] EQUIPMENT/APPARATUS WITH ONE HORIZONTAL AUGER FOR CUTTING UP AND MIXING OF FIBROUS PRODUCTS USED FOR THE PREPARATION OF ANIMAL FEED

[75] Inventor: Giuseppi Sgariboldi, Camairago, Italy

[73] Assignee: Sioux Automation Center, Inc., Sioux Center, Iowa

[21] Appl. No.: 64,241

[22] Filed: Dec. 3, 1992

[51] Int. Cl.⁶ .............................................. B02C 19/22
[52] U.S. Cl. .................................................. 241/260.1
[58] Field of Search ........................ 241/260.1, 101.7

[56] References Cited

U.S. PATENT DOCUMENTS

| | | | |
|---|---|---|---|
| 2,978,097 | 4/1961 | Blanshine | 241/260.1 X |
| 3,325,106 | 6/1967 | Hoffman et al. | 241/260.1 X |
| 4,509,700 | 4/1985 | Svengren | 241/260.1 X |
| 4,621,666 | 10/1985 | Ryan . | |
| 4,724,876 | 4/1986 | Ryan . | |
| 4,896,970 | 1/1990 | Schuler | 241/260.1 X |

FOREIGN PATENT DOCUMENTS

| | | | |
|---|---|---|---|
| 1122359 | 11/1984 | U.S.S.R. | 241/260.1 |
| 1282893 | 1/1987 | U.S.S.R. | 241/260.1 |
| 1386300 | 4/1988 | U.S.S.R. | 241/260.1 |
| 1431837 | 10/1988 | U.S.S.R. | 241/260.1 |

*Primary Examiner*—Timothy V. Eley
*Attorney, Agent, or Firm*—Timothy J. Martin

[57] ABSTRACT

An apparatus for the cutting and mixing of fibrous products for the preparation of animal feed which includes a hopper where equipments for the cutting and mixing of fibrous product are installed. Based on this invention, such mixing and cutting equipment is constituted by a single auger that is separated into two equal sections by a partition that is welded to the shaft of the auger itself. The auger is equipped with a first section of auger blades that turn counterclockwise. The hopper has a bottom that is partially cylindrical where the auger is installed. From this bottom, one wall extends practically vertical and the opposite one extends oblique.

6 Claims, 3 Drawing Sheets

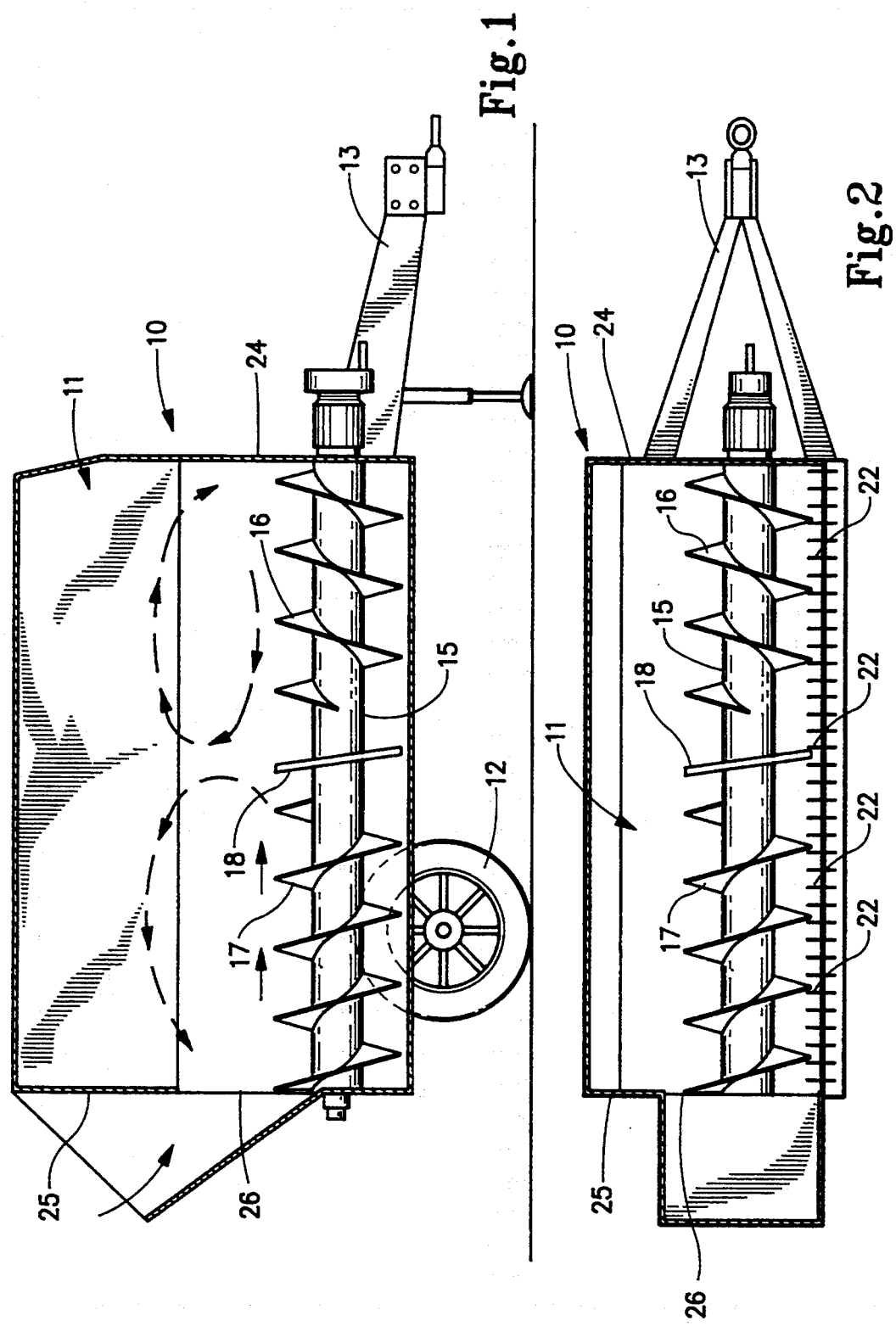

EQUIPMENT/APPARATUS WITH ONE HORIZONTAL AUGER FOR CUTTING UP AND MIXING OF FIBROUS PRODUCTS USED FOR THE PREPARATION OF ANIMAL FEED

BACKGROUND OF THE INVENTION

The present invention refers to an apparatus that includes one single horizontal auger for cutting and mixing of fibrous product used for preparation of animal feed. The apparatus can be fixed or towed or self-propelled.

The equipments which are known, and on the market, used for cutting and mixing of fibrous product for preparation of animal feeds, are made with a hopper in which are installed equipments for cutting and mixing of fibrous products such as dry hay, silage straw and etc or alfalfa, which are loaded into the known equipment from the top of the hopper.

The known auger equipments for cutting and mixing of fibrous product used for preparation of animal feed have augers which are either placed horizontally or vertically within the hopper. The mixed product is discharged out of a door.

The known equipment with horizontal augers have a smaller height and width when compared to the equipment having vertical augers and are good for quite a limited production and where there is a limited space.

Horizontal cutting and mixing equipments are known to include many augers. For example, one or two augers are located on the bottom of the hopper and two or three augers are located above the previous ones which operate by cutting and mixing the product in such a manner as to press and un-press the product so it does not congregate in dead places where the material is not mechanically treated by the augers.

Equipment with several augers, side by side or one over another one, are very expensive to build and to operate, and require complicated transmission systems connected with the augers and the gear box.

Moreover, the known equipment that has several augers, side by side or one above another one, does not satisfactorily perform the mixing and cutting of the feed product because within the hopper there are dead spots where material does stagnate.

Moreover, these known types of equipments which utilize several augers, are of larger dimensions and therefore more difficult to operate in a small area.

SUMMARY OF THE INVENTION

The general goal of this invention is to avoid the prior art difficulties of the known machines. Therefore, the present invention is extremely functional and can be built inexpensively and in smaller sizes. With this goal in mind, this invention is characterized by an apparatus for the cutting and mixing of fibrous products used for preparation of animal feed and includes a hopper in which is installed the equipment for cutting and mixing of fibrous products used for the preparation of animal feed. This apparatus is characterized by a single auger that is separated into two sections by a partition. The partition is attached to the auger itself.

The auger is equipped with a first set of blades turning clockwise and a second set of blades turning counterclockwise. The hopper is built with a partially cylindrical bottom designed around the auger. One wall of the hopper is substantially vertical, and the opposite wall of the hopper is oblique.

The structural and functional characteristics of this invention and its advantages compared to known techniques are more clearly defined by the following description based on the enclosed drawings, which shows an exemplary embodiment.

BRIEF DESCRIPTION OF THE DRAWINGS

FIG. 1 is the lateral elevation which shows the invention;

FIG. 2 is a top view;

DETAILED DESCRIPTION OF THE PREFERRED EMBODIMENT

Figure 3:
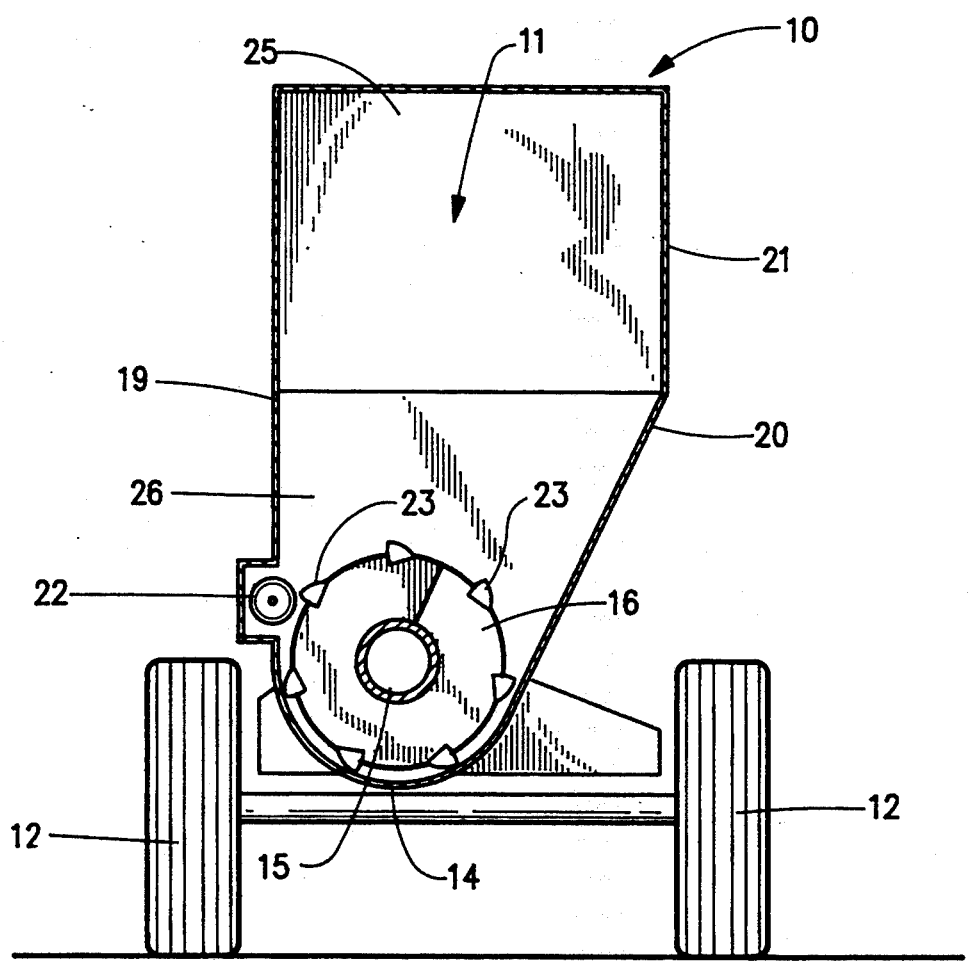
FIG. 3 is a cross-section.

Referring to the drawings, the whole apparatus invented is generally referred with 10, and is structurally formed by a metallic hopper 11, that is installed on wheels 12 and is operative to be pulled by other equipment such as a tractor or the like. This can be done by the pull bar 13.

In this invention, the hopper bottom is built as half a cylinder section 14. Installed in this hopper bottom is a single auger 15 which includes a set of clockwise blades section 16, and a set of counterclockwise blades section 17, and intermediate partition 18 divides these two sections 16 and 17 with the purpose that will be explained.

From the partially cylindrical bottom 14 of the hopper 11, there projects a partially vertical wall 19 and there projects an opposite oblique wall 20 which later continues into a section that is substantially vertical 21. (FIG. 3) In FIG. 3, we can see where the auger shaft 15 is located, and rotates within the hopper in an asymmetrical position compared to the central longitudinal plane section of the hopper.

Figure 4:
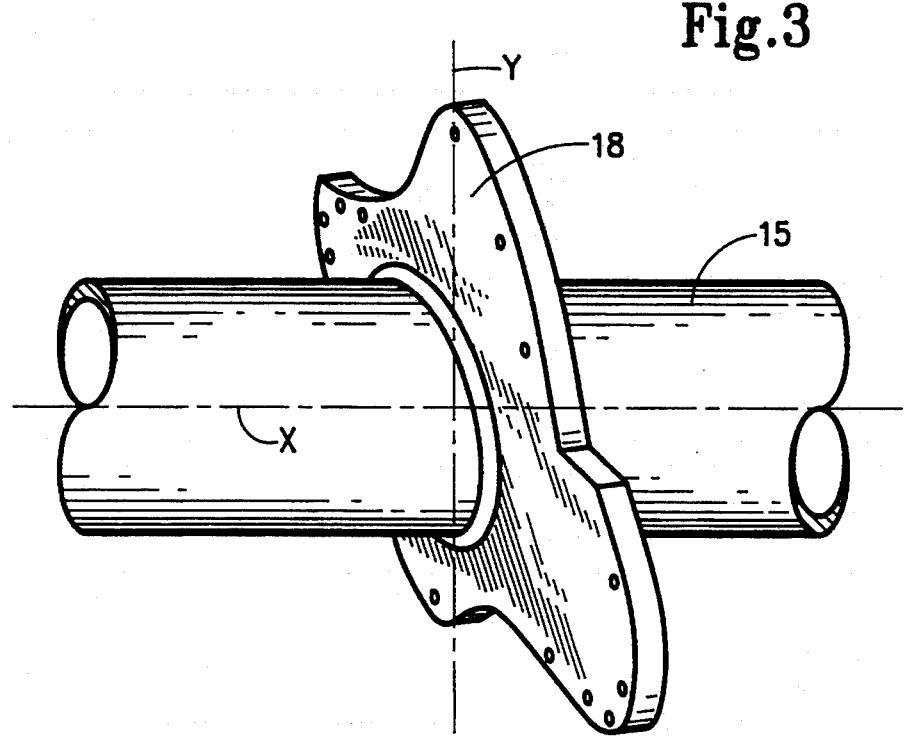
FIGS. 4 and 5 are details showing the partition between the clockwise set of blades and the counterclockwise set of blades.
Figure 5:
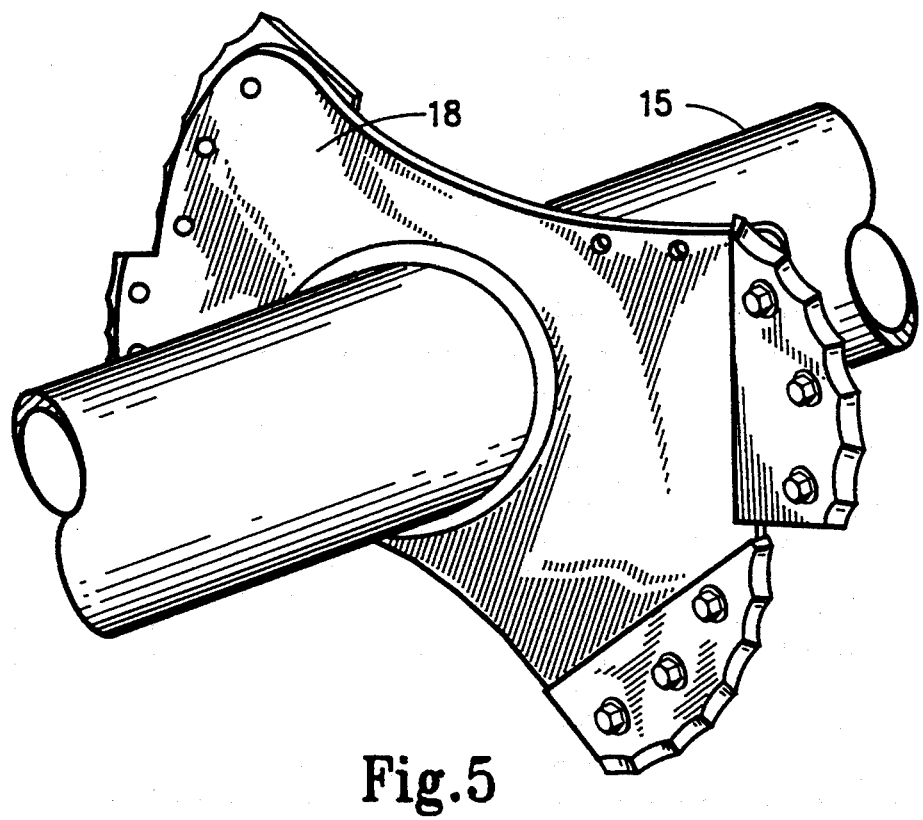

The intermediate partition 18 is assembled and solidly attached to the auger beam 15, with a slight double inclination in relationship to the X and Y axis which intersect perpendicularly in the symmetrical center of partition 18 (FIGS. 4 and 5). As you can clearly see in FIGS. 4 and 5, such partition 18 is molded or shaped with opposite lobes. In the hopper are counter knives 22 which cooperate with the knives 23 on the auger.

The function of the apparatus above is described briefly as follows. The fibrous material is loaded from the top inside the hopper 11 or from the back opening 26. The material is pushed by the clockwise section 16 and the counterclockwise section 17 of the auger 15 toward the center against the center partition 18. The material is then pushed up by the partition and then returned toward the end walls 24 and 25 of the hopper 11, in the direction of arrows in drawing 1 with a continuous movement such as a "fountain."

The oblique wall 20 assures the continuous movement toward auger 15, and the opposite vertical wall 19 is operative to stop the stagnation of material, so that there is always contact with the auger which transports the material back toward the center until it reaches the partition 18.

The combination of this unique configuration of the hopper 11 and the single auger 15 results in optimal mixing of produce and this positively effects the quality of the animal feed output, which is prepared with this product moreover.

The apparatus, specifically designed with a single auger, can be built in small compact dimensions, and at an extremely reasonable price. Furthermore, this can be achieved, due to the single auger and to the lack of a need for transmission motorization, gear box or more augers, as seen in the known other equipments. The present invention has significant advantages over the prior art equipment. In this way, we have reached our goals above mentioned.

I claim:

1. An apparatus for mixing of fibrous product for preparation of animal feeds, comprising:
   (a) a hopper having a bottom portion formed by a vertical wall and oblique wall joined together by a half-cylindrical bottom wall;
   (b) a single auger disposed axially along an auger axis in said bottom portion within a region formed by a cylindrical bottom wall, said auger having a first blade section and a second blade section with said first and second blade sections having opposite blade directions; and
   (c) a partition affixed to said auger intermediate between said first and second blade sections for rotation therewith such that rotation of said auger is operative to advance fibrous product against said partition and wherein rotation of said partition is operative to cause the fibrous product to be moved away from said auger and recirculated in said hopper.

2. Apparatus according to claim 1 wherein said partition has diametrically opposed lobes.

3. Apparatus according to claim 1, characterized by the fact that the first blade section and the second blade section are substantially equal in size.

4. Apparatus according to claim 1 wherein said partition is inclined with respect to the augur axis and an axis perpendicular to the auger axis.

5. Apparatus according to claim 1 wherein said auger axis is located asymmetrically with respect to a central longitudinal plane of said hopper.

6. Apparatus according to claim 1 wherein said first and second blade sections are each provided with knives.

* * * * *